United States Patent

Munch

[11] Patent Number: 5,248,418
[45] Date of Patent: Sep. 28, 1993

[54] 2-STAGE ULTRAFILTRATION SYSTEM FOR PHOTOGRAPHIC EMULSIONS

[75] Inventor: William D. Munch, Penfield, N.Y.

[73] Assignee: Eastman Kodak Company, Rochester, N.Y.

[21] Appl. No.: 928,801

[22] Filed: Aug. 12, 1992

Related U.S. Application Data

[62] Division of Ser. No. 658,167, Feb. 20, 1991.

[51] Int. Cl.⁵ ............................................. B01D 61/18
[52] U.S. Cl. .............................. 210/195.2; 210/257.2; 210/321.64; 210/321.65
[58] Field of Search ............... 210/637, 641, 644, 649, 210/321.64, 321.65, 195.2, 257.2, 294, 314

[56] References Cited

U.S. PATENT DOCUMENTS

| | | |
|---|---|---|
| 2,495,918 | 1/1950 | Bolton . |
| 2,611,490 | 9/1952 | Robinson . |
| 3,782,953 | 1/1974 | Maley . |
| 4,042,575 | 8/1977 | Eustache ........................ 210/641 |
| 4,083,780 | 4/1978 | Call . |
| 4,332,887 | 6/1982 | Gerber . |
| 4,334,012 | 6/1982 | Mignot . |
| 4,336,328 | 6/1982 | Brown . |
| 4,758,505 | 7/1988 | Hoffman . |
| 4,792,401 | 12/1988 | Truex et al. . |
| 4,797,354 | 1/1989 | Saitou et al. . |
| 4,816,290 | 3/1989 | Heki et al. . |
| 4,846,976 | 7/1989 | Ford . |
| 4,892,660 | 1/1990 | Sweet . |

FOREIGN PATENT DOCUMENTS

1137805 12/1982 Canada .

OTHER PUBLICATIONS

Research Disclosure-Jul. 1975.

*Primary Examiner*—Frank Sever
*Attorney, Agent, or Firm*—Nixon, Hargrave, Devans & Doyle

[57] ABSTRACT

Photographic emulsions, particularly those produced by a silver halide reaction, are concentrated and, optionally, washed in a 2-stage ultrafiltration system. The system includes a spiral wound ultrafiltration module and a plate and frame ultrafiltration module. Serial use of these two ultrafiltration systems permits the viscosity of the resulting emulsion to be increased. at commercial scale production levels, to a level suitable for curtain coating photographic substrates.

6 Claims, 4 Drawing Sheets

2-STAGE ULTRAFILTRATION SYSTEM FOR PHOTOGRAPHIC EMULSIONS

This is a division of application Ser. No. 07/658,167, filed on Feb. 20, 1991.

FIELD OF THE INVENTION

The present invention relates to the purification and concentration of photographic emulsions with ultrafiltration.

BACKGROUND OF THE INVENTION

Radiation-sensitive silver halide grains can be prepared by a variety of techniques. One common approach is a batch preparation technique commonly referred to as single-jet (or single-run) precipitation. According to this procedure, a silver salt solution is run into a reaction vessel containing a halide salt solution and a dispersing medium, usually gelatin. The first halide ions already in the reaction vessel react with silver salt to form silver halide grain nuclei. As additional silver salt solution is introduced, more silver halide is formed. Some of this silver halide forms additional nuclei while the remaining silver halide is concurrently deposited on the existing silver halide grain nuclei. Single-jet precipitation is discussed by T.H. James, "The Theory of the Photographic Process," 4th Ed., MacMillan, 1977, Chapter 3 and is specifically illustrated by Trivelli and Smith "The Photographic Journal," Vol. LXXIX, May 1939, pp. 300-338.

Another approach to silver halide preparation is a batch approach commonly referred to as a double-jet (or double-run) precipitation. According to this approach, a silver salt solution and a halide salt solution are concurrently fed into a reaction vessel containing a dispersing medium, commonly gelatin dissolved in water. Precipitation of silver halide grains preferably occurs in two distinct stages. In a first, nucleation stage, initial silver halide grain formation occurs. This is followed by a second, growth stage in which additional silver halide, formed as a reaction product, precipitates onto the initially formed silver halide grains. This results in growth of the silver halide grains. Batch double-jet precipitation typically takes place under conditions of rapid stirring of reactants in which the volume within the reaction vessel continuously increases during the silver halide precipitation make or run.

Continuous double-jet precipitation procedures are known, as illustrated by British Patent No. 1,302,405, U.S. Pat. Nos. 3,801,326 to Claes, and 4,046,576 to Terwilliger et al.

U.S. Pat. No. 3,790,386 to Posse et al. is directed to a variant form of continuous double-jet precipitation in which the silver halide emulsion is continuously withdrawn from a constant volume reaction vessel and fed to a separate ripening vessel which is at least 10 times the volume of the reaction vessel. No provision is made for the removal of soluble salts or dispersing medium from the silver halide emulsions produced. As a result, the total volume of the emulsion in the reaction and ripening vessels increases in direct proportion to the volume of salt solution added. Similar continuous double-jet precipitation arrangements are disclosed by U.S. Pat. Nos. 3,897,935 to Forster et al., 4,147,551 to Finnicum et al., and 4,171,224 to Verhille et al.

The purification and concentration of silver halide emulsions by ultrafiltration is known in the art. Such techniques are illustrated by "Research Disclosure," Vol. 102, October 1972, Item 10208, and Vol. 131, March 1975, Item 13122. "Research Disclosure" is published by Industrial Opportunities, Ltd., Homewell, Havant Hampshire, P09, IEF, U. K. It is also recognized that the soluble salts, such as alkali nitrate, formed as a by-product in precipitating silver halide, can be washed and removed by ultrafiltration while continuously adding makeup water to the emulsion. After the soluble salt content has been reduced to the desired level, it is taught to terminate the addition of makeup water and to reduce the liquid volume of the emulsion also by ultrafiltration. The liquid volume of the emulsion can also be reduced by ultrafiltration after addenda have been added and before coating.

Ultrafiltration is preferably accomplished by pumping emulsion from the reaction vessel into contact with a semipermeable membrane of the ultrafiltration module so that a pressure difference is established across the membrane. The membrane contains pores sized to permit passage of molecules below a particular molecular weight while retaining larger molecules and silver halide grains in the emulsion.

The membranes employed in ultrafiltration are typically anisotropic membranes which comprise a very thin layer of extremely fine pore texture supported upon a thicker porous structure. Useful membranes can be formed from a variety of polymeric materials, such as poly(vinyl chloride), poly(vinyl carboxylate) (e.g., poly(vinyl formate) and poly(vinyl acetate)), poly(vinyl alcohol), polysulfones, poly(vinyl ether), polyacrylamides and polymethacrylamides, polyimides, polyesters, polyfluoroalkylenes (e.g., polytetrafluoroethylene and polyvinylidene fluoride), and cellulosic polymers, such as, cellulose and cellulose esters (e.g., cellulose acetate, cellulose butyrate and cellulose acetate butyrate).

In U.S. Pat. No. 4,336,328 to Brown et al., the walls of the silver halide reaction vessel are formed from an ultrafiltration membrane which concentrates silver halide grains within the vessel, while permitting solvent and low molecular weight materials to permeate.

U.S. Pat. Nos. 4,334,012 to Mignot ("Mignot") and 4,758,505 to Hoffmann ("Hoffmann") disclose ultrafiltration modules which are in a loop through which photographic emulsions in the silver halide reaction vessel circulate. In Hoffmann, the ultrafiltration module is provided with a preliminary filter (e.g., a sieve). Mignot's system utilizes a single ultrafiltration module or a plurality of such modules placed in series to permit the dispersing medium from the first module to be fed to the next. The concentrate from each of Mignot's serially-arranged ultrafiltration modules is returned to the reaction vessel. Hoffmann mentions using either ultrafiltration modules in a reaction vessel or tubular ultrafiltration modules without suggesting any preference amongst these alternatives.

Once concentrated and washed, the emulsion must be finished by adding chemical and optical sensitizers so that the emulsion will react to particular intensities and wavelengths of radiation. The finished silver halide emulsion can then be applied to photographic film, paper, or plates as one of a plurality of separate and distinct layers. Such coatings are conventionally applied by bead coating or by curtain coating. Examples of both these coating techniques are disclosed in U.S. Pat. No. 4,287,240 to O'Connor. Such coating procedures require that the emulsion be concentrated to a high viscosity level. This prevents inter-layer mixing in the coated film or paper, which is a particularly significant problem in the lower coating layers of such articles. It is especially important for photographic emulsions to have a high viscosity in curtain coating operations to ensure that the curtain remains stable and hangs properly. A high viscosity is also desirable so that both the volume of emulsion stored between ultrafiltration and coating as well as the amount of water to be removed after coating are reduced.

Unfortunately, the use of conventional spiral wound ultrafiltration modules alone cannot concentrate photographic emulsions on a commercial scale to a viscosity suitable for curtain coating. This is because the construction of the spiral wound ultrafiltration module limits the maximum concentrate viscosity to typically 20-40 centipoise, a value dependent strongly on the design of the module. Plate and frame ultrafiltration modules can concentrate to viscosities above 100 centipoise, but with long process times. This occurs because plate and frame ultrafiltration modules have a much smaller membrane area that contacts a given volume of liquid than do spiral wound ultrafiltration modules. As a result, neither a spiral wound ultrafiltration module nor a plate and frame ultrafiltration module can practically produce high viscosity emulsions under commercial scale conditions.

SUMMARY OF THE INVENTION

The present invention relates to a 2-stage ultrafiltration process for concentrating and, optionally, washing silver halide emulsions. Such emulsions typically contain water, gelatin molecules having a range of molecular weights (e.g., 1,000 to greater than 1,000,000), ions or ripeners with low molecular weights (e.g., 7 to 300), and large sized (e.g., 0.05 to 10.00 microns) silver halide grains. When treated by the process of the present invention, the viscosity of such emulsions is elevated to a level suitable for coating photographic papers and films. This process is particularly useful prior to curtain coating in which high viscosities are needed to maintain a stable, properly-shaped curtain. The 2-stage ultrafiltration process of the present invention is particularly useful in conjunction with silver halide reaction processes which yield products requiring high concentrations and, typically, washing.

In the process of the present invention, such emulsions are first treated with a spiral wound ultrafiltration module in which desired high molecular weight gelatin and silver halide grains are concentrated, while low molecular weight materials, such as ions, ripeners, and low molecular weight gelatin permeate the ultrafiltration membrane and are discarded. Once concentration has been completed, emulsion left in the spiral wound ultrafiltration module and its associated piping is reclaimed. This reclaimed material is then treated by a plate and frame ultrafiltration module in which high molecular weight gelatin and silver halide grains are further concentrated. Again, low molecular weight materials permeate the ultrafiltration membrane and are discarded.

In addition to concentrating, ultrafiltration can be used to purify or wash emulsions. Washing involves a reduction in the concentration of low molecular weight materials in the emulsion. Such washing can be carried out in the spiral wound ultrafiltration module or in the plate and frame ultrafiltration module by feeding a solvent, usually water, into the module after initially concentrating emulsion. Washing is carried out by adding solvent at the same rate as permeate is removed, which is commonly referred to as constant volume washing or diafiltration. Solvent and low molecular weight materials, such as salts, pass through the ultrafiltration membrane while high molecular weight and large size materials remain behind. When washing is completed, the flow of solvent is terminated, and the emulsion within the module is allowed to concentrate further. The resulting concentrated emulsion can then be reclaimed from the ultrafiltration modules and their associated piping. In summary, where a washing step is employed in either a spiral wound ultrafiltration module or a plate and frame ultrafiltration module, material being treated by that module is subjected to a process sequence of concentrating, washing, concentrating further, and reclaiming.

In the manufacture of photographic emulsion, material from the silver halide reaction vessel may be transferred to a feed vessel or vessels connected to the spiral wound and plate and frame ultrafiltration modules in series. This arrangement permits emulsion that is left in each module and its associated piping to be reclaimed and conveyed back to the feed vessel. Such conveying can be accomplished by passing compressed gas (e.g., air) or water through the ultrafiltration module typically in a direction opposite that employed during concentration and washing. Such fluids can be injected as discrete pulses to dislodge the concentrated emulsion more effectively.

The combination of spiral wound and plate and frame ultrafiltration modules in series is particularly useful in producing high viscosity photographic emulsions for commercial-scale curtain coating. This combination overcomes the previously-noted deficiencies encountered by these modules individually.

In the present 2-stage process, the spiral wound ultrafiltration module separates the bulk of the volume of the desired large sized and high molecular weight materials from the volume of the smaller components in the photographic emulsion. This typically results in only a small increase in emulsion viscosity, but a large decrease in volume. The emulsion concentrated by the spiral wound ultrafiltration module can then be fed to the plate and frame ultrafiltration module to increase viscosity further. Short processing times can be achieved in the plate and frame module, because most of the volume of permeable material originally in the emulsion has already been removed by the spiral wound ultrafiltration module. To achieve maximum efficiency, ultrafiltration in the spiral wound module typically continues until a viscosity of 20 to 40 centipoise is achieved, depending on module design. When such viscosity values are obtained, the concentrated emulsion should be reclaimed and then fed to the plate and frame ultrafiltration module(s). Ultrafiltration in the plate and frame module typically continues until an emulsion viscosity of 60 centipoise is achieved. Such viscosity values can be experimentally correlated to pressure drop values across the ultrafiltration modules.

Although it is possible to carry out the 2-stage ultrafiltration process of the present invention with one pair of serially-arranged spiral wound and plate and frame ultrafiltration modules, efficient commercialization requires use of a plurality of paired spiral wound and plate and frame modules with each pair operating as parallel banks. It is also advantageous to utilize a plurality of parallel spiral wound ultrafiltration modules and/or a plurality of parallel plate and frame ultrafiltration modules in each of the spiral wound/plate and frame module pairings. The number of spiral wound ultrafiltration modules and plate and frame ultrafiltration modules selected is dictated by whether it is desired to minimize total processing time (requiring a maximum number of modules) or to minimize capital costs (requiring a minimum number of such modules).

DETAILED DESCRIPTION OF THE INVENTION

Figure 1:
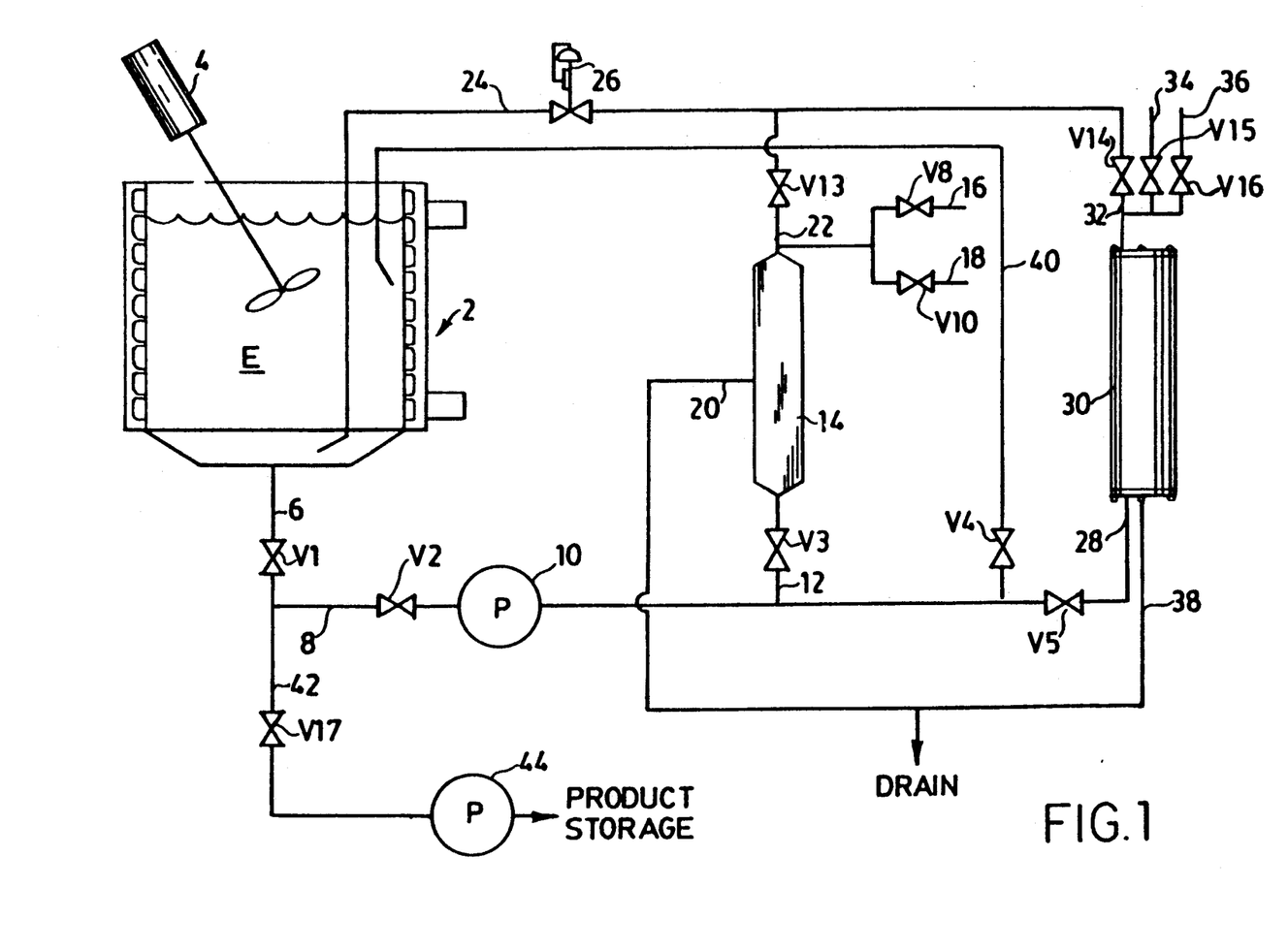
FIG. 1 is a schematic view of a first embodiment of the process of the present invention.

FIG. 1 is a schematic view of a first embodiment of the process of the present invention. In this embodiment, photographic emulsion E, comprising water, gelatin molecules having a wide range in molecular weight (e.g., 1,000 to 1,000,000), ions or ripeners of low molecular weight (e.g., 7 to 300), and large-sized (e.g., 0.05 to 10.00 microns) silver halide grains, are initially stored in vessel 2. Vessel 2 is usually separate from the silver halide reaction vessel in which the silver halide grains are formed so that further silver halide production can continue simultaneously with emulsion concentration and, optionally, washing. Materials held in vessel 2 are mixed with agitator 4. By opening valve V1, emulsion E can be removed from vessel 2 through outlet line 6. If valve V2 is opened, emulsion E will enter process line 8 and be conveyed by process pump 10 to the 2-stage ultrafiltration system described below. Alternatively, emulsion E can be withdrawn to product storage through product line 42 by opening valve V17 and operating product pump 44.

When utilizing the 2-stage ultrafiltration system of the present invention, photographic emulsion E is first conveyed by process pump 10 to spiral wound ultrafiltration module 30 by opening valve V5 so that the emulsion can pass through spiral wound ultrafiltration inlet line 28. Spiral wound ultrafiltration module 30 is also provided with outlet line 32 having valve V14 and pressure control valve 26 on line 24.

Figure 3:
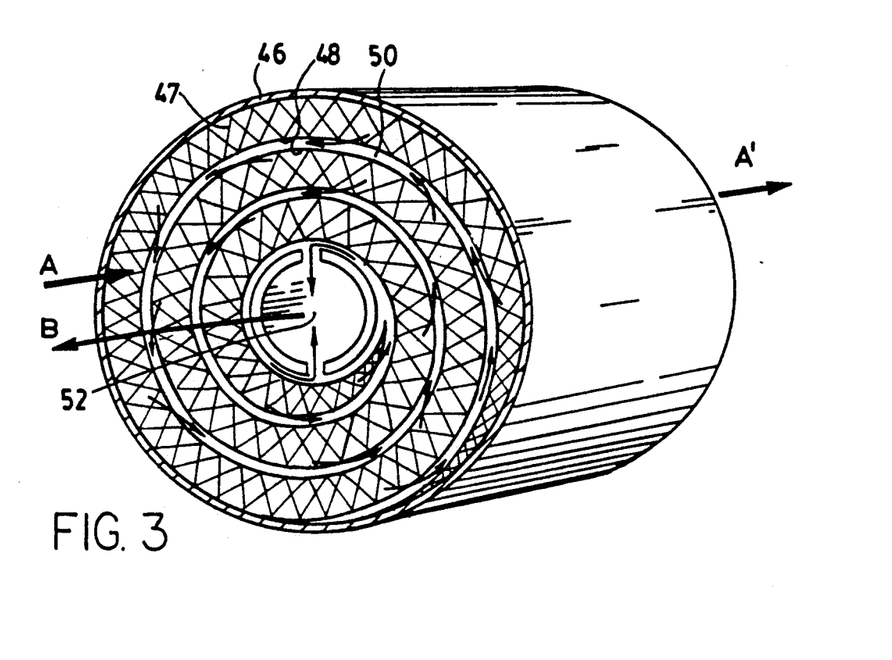
FIG. 3 is a perspective view of a spiral wound ultrafiltration module suitable for use in the present invention.

FIG. 3 is a perspective view of a spiral wound ultrafiltration module suitable for use in the process of the present invention. Typically, such modules have outer wall 46 within which is spiral-wound ultrafiltration membranes 48, supported by spacer 47, and spiral-wound passage 50 leading to central permeate discharge tube 52. Photographic emulsion is fed to this module along the path defined by arrow A and into the area occupied by spacer 47. Lower molecular weight materials permeate through membranes 48 into spiral passage 50, as shown by the arrows passing through membrane 48 to spiral passage 50. From spiral passage 50, permeate flows into permeate discharge tube 52 which carries this low molecular weight material out of the ultrafiltration module along the path defined by arrow B. Concentrated emulsion, which does not permeate membrane 48, travels through the area occupied by spacer 47 and leaves the module along the path defined by arrow A'.

Spiral wound ultrafiltration modules are well known in the art and are available from a variety of sources. One example is the OSMO ® sepralator sold by Osmonics, Inc., Minnetonka, Minn. U.S. Pat. No. 4,083,780 to Call, which is hereby incorporated by reference, discloses a spiral wound ultrafiltration module.

Returning to FIG. 1, material permeating the membrane of spiral wound ultrafiltration module 30 passes to the drain through permeate discharge line 38.

Desired large-sized and high molecular weight materials concentrated by spiral wound ultrafiltration module 30 are returned to vessel 2 through lines 32 and 24 which are provided with valve V14 and pressure control valve 26.

After the concentration process has been completed, concentrated emulsion left in spiral wound ultrafiltration module 30, and associated piping must be reclaimed to vessel 2. Material in spiral wound ultrafiltration module 30 and line 28 is removed by opening valve V4, closing valve V14, and opening valve V15 to hot water line 34 or valve V16 for air line 36. This forces emulsion out of spiral wound ultrafiltration module 30, through lines 28 and 40, and back to vessel 2. Reclaim water and air are separately injected into spiral wound ultrafiltration module 30, preferably, by pulsing them, to dislodge more effectively material left in the ultrafiltration module after concentration is completed. This procedure may be preceded by operating pump 10 with valves V1 and V4 closed, valve V14 open, and by opening a vent valve (not shown) between valve V1 and the suction of pump 10.

Concentrated, photographic emulsion E can then be withdrawn from vessel 2, in substantially the manner discussed supra, and fed to plate and frame ultrafiltration module 14 by operating process pump 10 and opening valve V3 on inlet line 12.

Figure 4:
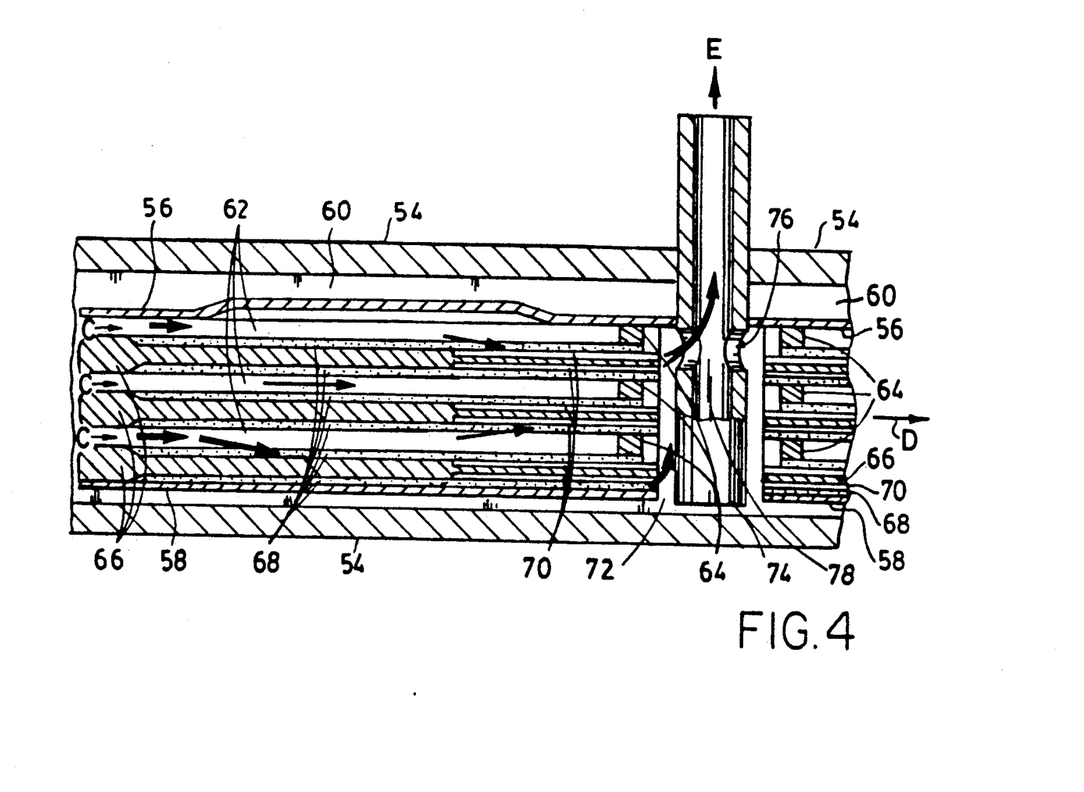
FIG. 4 is a cross-sectional view of a plate and frame ultrafiltration module suitable for use in the process of the present invention.

FIG. 4 is a cross-sectional view of a plate and frame ultrafiltration module suitable for use in the process of the present invention. As depicted, the plate and frame ultrafiltration module is provided with outer walls 54 within which is interior chamber 60. Chamber 60 contains plate cover 56 and plate base 58, between which a plurality of plates 66 and membranes 68 are located. A plurality of passages for feed flow 62 are also positioned between plate cover 56 and plate base 58. Low molecular weight material within passages 62 will permeate membranes 68 and collect in passages 70. Passages 70 lead to discharge chamber 72 within which is discharge conduit 74 having conduit inlet 76 leading to conduit interior 78. Discharge chamber 72 has a generally cylindrical shape which surrounds conduit 74. Passages 62 are plugged at chamber 72 by annular gaskets 64. As a result, material in passages 62 follows gaskets 64 around chamber 72 and conduit 74 from the left side to the right side of FIG. 4. On this right side, additional permeation of material in passages 62 will occur before concentrate is discharged.

Plate and frame ultrafiltration modules are well known in the art. Such devices are available from the Amicon Division of W. R. Grace & Company, Danvers, Mass. as housings containing cartridges formed from IOPLATE ® membrane elements.

In operation, material fed to the plate and frame ultrafiltration module of FIG. 4 follows the path defined by arrows C. Such feed material enters passages 62 from which low molecular weight materials permeate membrane 68 and enter passages 70. Such permeate passes from passages 70 into discharge chamber 72 where it enters discharge conduit 74 through conduit inlets 76. Permeate within conduit interior 78 departs from the plate and frame ultrafiltration module of FIG. 4 along the path defined by arrow E. Large sized and high molecular weight materials do not permeate, but remain within passages 62 and depart from the module along the path defined by arrow D.

Returning to FIG. 1, photographic emulsion E in inlet line 12 is treated by plate and frame ultrafiltration module 14 so that large sized and high molecular weight materials are concentrated. Low molecular weight materials permeate the ultrafiltration membrane and pass through permeate discharge line 20 to drain.

Once concentration is concluded, the contents of plate and frame ultrafiltration module 14 and conduit 24 may be allowed to return, without assistance, to vessel 2 by operating pump 10, having the above-described vent valve (not shown), with valve V1 closed. Remaining emulsion is then forced back to vessel 2 by either opening valve V8 and injecting heated water through line 16 or opening valve V10 and injecting air through line 18. These fluids are preferably injected in pulseform to enhance reclamation. Material returned to vessel 2 with such fluid assistance travels through lines 12 and 40 by opening valves V3 and V4.

In operation, the 2-stage ultrafiltration system of FIG. 1 operates as follows. Photographic emulsion E is discharged from vessel 2 through outlet line 6 and into process line 8 by opening valves V1 and V2. Emulsion is prevented from passing to product storage by keeping valve V17 closed. Emulsion within process line 8 is conveyed by process pump 10 to spiral wound ultrafiltration module 30 when valve V5 in inlet line 28 is opened. Meanwhile, valves V3, V4, and V13 are kept closed. As spiral wound ultrafiltration module 30 is filled, pressure control valve 26, which was initially fully opened, closes partially to create a back pressure within spiral wound ultrafiltration module 30. This enhances permeation of material through the membrane of the spiral wound ultrafiltration module 30. Such permeate passes to the drain through permeate discharge line 38. Material which does not permeate passes from spiral wound ultrafiltration module 30 to vessel 2 through lines 32 and 24 and open valve V14. Circulation of emulsion from vessel 2 to module 30 and from module 30 back to vessel 2 continues until the emulsion is concentrated to a suitable level. Typically, photographic emulsion E is treated by spiral wound ultrafiltration module 30 until concentrated to a viscosity of 20 to 40 centipose.

After concentration has been completed, pump 10 is shut off, leaving concentrated emulsion in spiral wound ultrafiltration module 30 and its associated piping. This concentrated emulsion has large sized and high molecular weight materials (e.g., large gelatin molecules and silver halide grains) which must be reclaimed. First, pump 10, having the above-described vent valve (not shown), may be operated with valve V1 closed to move emulsion through lines 28, 32, and 24 and spiral wound ultrafiltration module 30 to vessel 2. Remaining emulsion is reclaimed by closing valve V14 and opening valve V4 so that material can be returned to vessel 2 through by-pass line 40 by separately opening valves V15 or V16 to hot water line 34 or air line 36, respectively. These valves can be alternately opened and closed to inject pulses of such fluids into spiral wound ultrafiltration module 30. As a result, reclaimed emulsion is conveyed from spiral wound ultrafiltration module 30, through inlet line 28 and by-pass line 40 to vessel 2. The volume of reclaim water used should be limited, because its use in reclamation reduces the degree of concentration achieved by spiral wound ultrafiltration module 30.

Where the photographic emulsion must be washed, this procedure is carried out prior to reclaiming by adding a solvent (e.g., water) from a solvent source (not shown) to vessel 2 at the same rate as permeate is withdrawn through line 38. This keeps the volume in vessel 2 constant. During washing, emulsion circulates through spiral wound ultrafiltration module 30 in the same fashion as emulsion originally present in vessel 2 was fed to and treated by spiral wound ultrafiltration module 30 during concentration. Again, the solvent and any salts removed from the emulsion, during washing, are passed to the drain through outlet line 38. After washing is completed (typically when the emulsion salt concentration is reduced by 95% from that prior to any washing), the flow of solvent into vessel 2 is terminated, and the emulsion is allowed to concentrate by circulating it between vessel 2 and spiral wound ultrafiltration module 30, as described previously. This final concentration step in spiral wound ultrafiltration module 30 continues typically until the emulsion has a viscosity of 20 to 40 centipoise.

Following treatment in spiral wound ultrafiltration module 30, concentrated and, optionally, washed photographic emulsion, which has been reclaimed to vessel 2, is treated in plate and frame ultrafiltration module 14 to achieve further concentration and, if desired, washing. Concentrated photographic emulsion within vessel 2 passes through outlet line 6 and process line 8 by opening valves V1 and V2, while valve V17 remains closed. Process pump 10 then transfers emulsion to plate and frame ultrafiltration module 14 by opening valves V3 and V13 to inlet line 12 and outlet line 22, respectively. At this time, valves V4, V5, and V14 are closed. Initially, pressure control valve 26 is fully opened, but it closes somewhat to create a back pressure within plate and frame ultrafiltration module 14 as this module fills with emulsion. As material permeates through the membrane of plate and frame ultrafiltration module 14, it is discharged to the drain through permeate discharge line 20.

Material concentrated within plate and frame ultrafiltration module 14 returns to vessel 2 through lines 22 and 24. From vessel 2, emulsion is continuously cycled to and from plate and frame ultrafiltration module 14 until the emulsion is concentrated to a suitable viscosity. Typically, such concentration can be to viscosities of 100 centipoise, although the configuration of plate and frame module 14 can be designed to achieve viscosities as high as 400 centipoise.

After a suitable level of concentration is achieved, emulsion within plate and frame ultrafiltration module 14 and its associated piping may be reclaimed by first closing valve V1 and operating pump 10, with the above-described vent valve (not shown) opened, to force some material to vessel 2. Remaining material is reclaimed by closing valve V13 and opening valve V4 to by-pass line 40. The sequential and alternative opening and closing of valves V8 and V10 to hot water line 16 and air line 18, respectively, is then used to dislodge emulsion left in plate and frame ultrafiltration module 14 and its associated piping in the same fashion as in spiral wound ultrafiltration module 30. These fluids force the reclaimed emulsion through valves V3 and V4, inlet line 12, and by-pass line 40 back to vessel 2. Again, such use of reclamation water should be limited, because it reduces the level of concentration previously achieved.

After initial concentration and prior to any such reclamation, the emulsion concentrated within plate and frame ultrafiltration module 14 may be washed by adding solvent (e.g., water) from a solvent source (not shown) to vessel 2 at the same rate as permeate is withdrawn through line 20. This keeps the volume in vessel 2 constant. During washing, emulsion circulates through outlet line 6, process line 8, and valves V1 and V2 to process pump 10. Process pump 10 injects the emulsion into plate and frame ultrafiltration module 14 through inlet line 12 and valve V3, while valves V4, V5, and V14 remain closed. The solvent, together with any salts, permeates through the membrane of plate and frame ultrafiltration module 14 and passes through permeate discharge line 20 to the drain. Material which does not permeate passes through lines 22 and 24 back to vessel 2. Such addition and solvent circulation between vessel 2 and plate and frame ultrafiltration module 14 continues until washing is completed (typically when the emulsion's salt concentration is reduced by 95% from that prior to any washing). Washing is typically performed only in either spiral wound ultrafiltration module 30 or plate and frame ultrafiltration module 14, but not both. Either of these techniques alone can be used to wash to a suitable salt concentration. When solvent addition is terminated, the emulsion is allowed to concentrate by circulating it between vessel 2 and module 14 in the same manner as emulsion was previously concentrated. This final concentration step in plate and frame ultrafiltration module 14 continues until a desired viscosity is reached (e.g., 60 centipoise).

The final concentrated, reclaimed, and, optionally, washed photographic emulsion is transferred from vessel 2, through lines 6 and 42, to storage by opening valves V1 and V17 and operating product pump 44.

Figure 2:
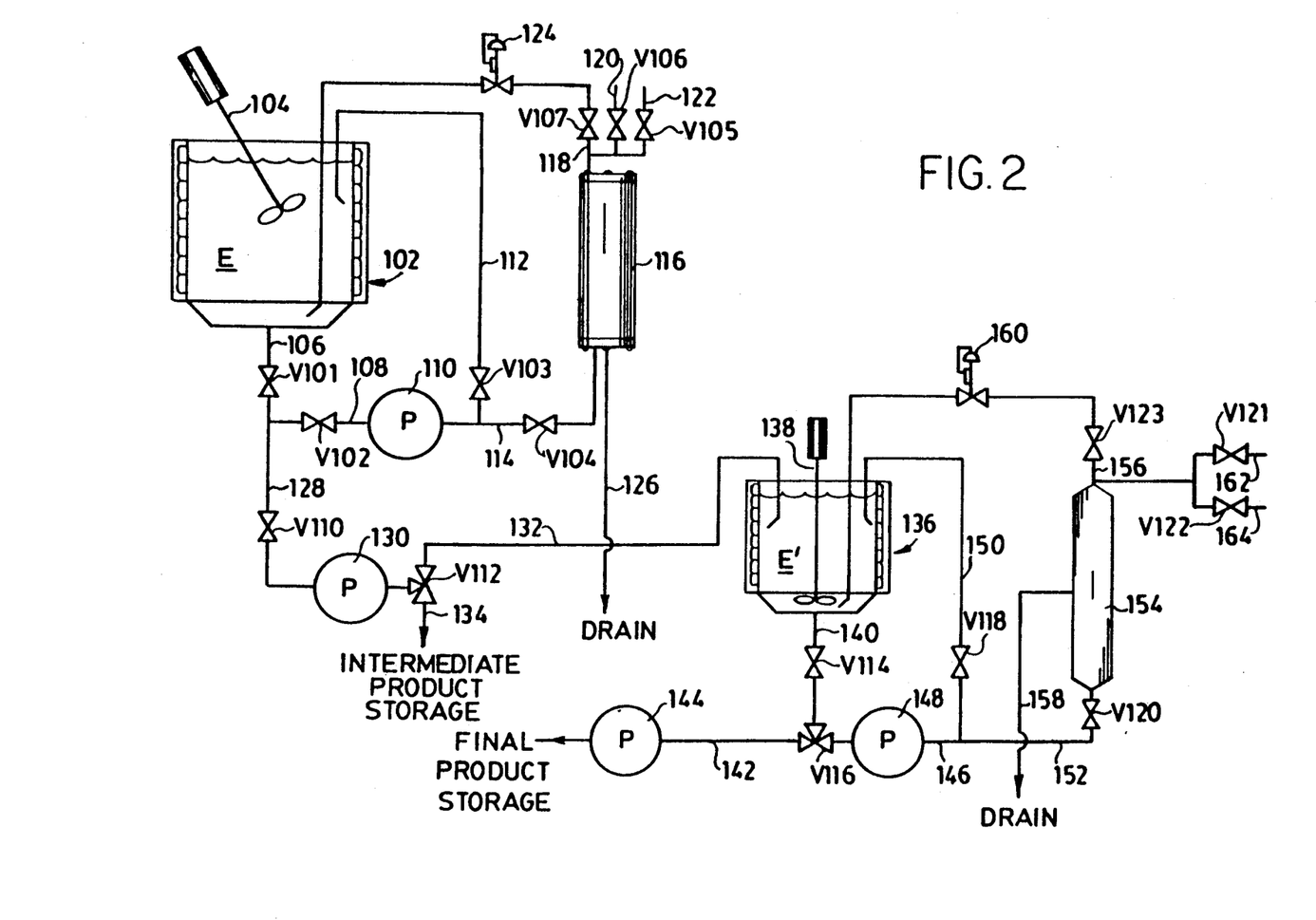
FIG. 2 is a schematic view of a second embodiment of the process of the present invention.

FIG. 2 is a schematic view of a second embodiment of the process of the present invention. This embodiment is generally similar to that of FIG. 1 except that a separate intermediate vessel 136 is employed to feed emulsion to and accept emulsion from plate and frame ultrafiltration module 154. The advantage of the embodiment of FIG. 2 over that of FIG. 1 is that more emulsion can be treated in a given period because material can be simultaneously treated by both types of ultrafiltration modules. The embodiment of FIG. 1, however, requires lower capital expenditures.

In the embodiment of FIG. 2, photographic emulsion E, initially in vessel 102, having agitator 104, is discharged through outlet line 106 when valve V101 is opened. Such material is fed to spiral wound ultrafiltration module 116 through lines 108 and 114 by opening valves V102 and V104 and operating process pump 110. In addition, inlet line 114 is connected to by-pass line 112 when valve V103 is opened for returning reclaimed material to vessel 102. Spiral wound ultrafiltration module 116 is also provided with outlet line 118 having valve V107 and pressure control valve 124. Permeate is discharged to drain through line 126. Reclaim is achieved with hot water line 120, having valve V106, and air line 122, having valve V105.

Photographic emulsion E is concentrated, reclaimed, and, optionally, washed in this portion of the process depicted in FIG. 2 in substantially the same fashion as described above with respect to FIG. 1. As a result, that emulsion is typically concentrated to a viscosity of 20 to 40 centipoise.

The emulsion concentrated, reclaimed, and, optionally, washed by spiral ultrafiltration is transferred from vessel 102 to intermediate vessel 136 through outlet line 106, transfer line 128, and vessel feed line 132 by opening valves V101, V110, and V112 and operating pump 130. Meanwhile, valve V102 remains closed. Alternatively, this emulsion can be conveyed to storage via intermediate product line 134 by adjusting three-way valve V112.

In intermediate vessel 136, having agitator 138, photographic emulsion E' is held for treatment with plate and frame ultrafiltration module 154. Emulsion to be treated in plate and frame ultrafiltration module 154 is withdrawn from vessel 136 and conveyed through outlet line 140 and process lines 146 and 152, by opening valves V114, V116, and V120 and operating process pump 148. Plate and frame ultrafiltration module 154 is provided with outlet line 156 having valve V123 and pressure control valve 160, permeate discharge line 158, hot water line 162 with valve V121, and air line 164 with valve V122. Connected to inlet line 152 is by-pass line 150 with valve V118 through which reclaimed emulsion can be transferred from plate and frame ultrafiltration module 154 and its associated piping to vessel 136.

Photographic emulsion E' is concentrated, reclaimed, and, optionally, washed in plate and frame ultrafiltration module 154 of FIG. 2 in substantially the same fashion as described above with respect to FIG. 1. Washing can then take place in either (but not both) spiral wound ultrafiltration module 116 or plate and frame ultrafiltration module 154. Following washing, the emulsion is typically concentrated to a viscosity of 60 centipoise.

The concentrated, reclaimed, and, optionally, washed emulsion ultimately all returns to vessel 136 and is conveyed to final product storage by opening valves V114 and V116 in lines 140 and 142 and operating pump 144.

Figure 5:
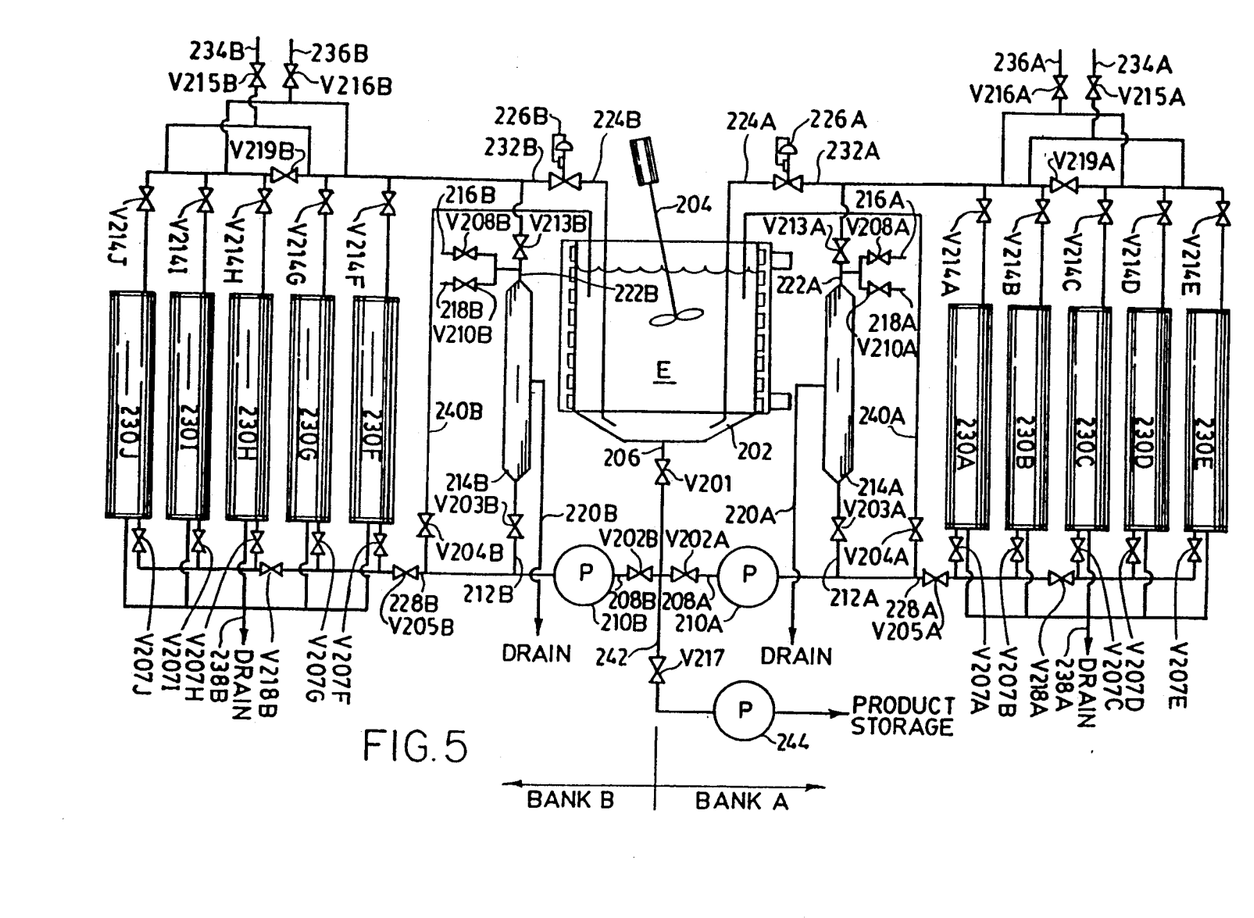
FIG. 5 is a schematic view of a third embodiment of the process of the present invention.

FIG. 5 is a schematic view of a third embodiment of the process of the present invention. This system is essentially the same as that of FIG. 1 except that there are two parallel banks of equipment, including serially-connected spiral wound and plate and frame ultrafiltration modules—i.e. bank A containing spiral wound ultrafiltration modules 230A–E and plate and frame ultrafiltration module 214A and bank B containing spiral wound ultrafiltration modules 230F–J and plate and frame ultrafiltration module 214B. The plurality of spiral wound ultrafiltration modules 230A–E and F–J in each such bank are used in parallel. This processing system is particularly useful for commercial scale operations.

The schematic process of FIG. 2, with an intermediate vessel, can similarly be modified to include parallel banks of a plurality of parallel spiral wound ultrafiltration modules. In addition, a plurality of downstream, parallel plate and frame ultrafiltration modules can be utilized.

In the embodiment of FIG. 5, photographic emulsion E is stored in vessel 202 having agitator 204. The emulsion is discharged into outlet 206 by opening valve V201. When valves V202A and B are opened (while valve V217 is kept closed), photographic emulsion is fed to pumps 210A and B through lines 208A and B of banks A and B, respectively. Pumps 210A and B respectively convey emulsion through lines 228A and B to the spiral wound ultrafiltration modules 230A–J or through lines 212A and B to plate and frame ultrafiltration modules 214A and B. The spiral wound ultrafiltration modules have inlet lines connected to lines 228A and B with valves V207A–J, permeate discharge lines 238A and B, outlet lines 232A and B with valves V214A–J and connected to lines 224A–B, reclaim hot water line 234A–B with valves V215A–B, and reclaim air lines 236A–B with valves V216A–B. Outlet lines 232A–B are provided with pressure control valves 226A–B.

Plate and frame ultrafiltration modules 214A–B are provided with inlet lines 212A–B having valves V203A–B, outlet lines 222A–B having valves V213A–B, permeate lines 220A–B, reclaim hot water lines 216A–B having valves V208A–B, and reclaim air lines 218A–B having valves V210A–B. Banks A and B also include by-pass lines 240A–B with valves V204A–B.

Product in vessel 202 is discharged to storage through line 242 by opening valve V217, closing valves V202A–B, and operating pump 244.

In use, the process schematically depicted in FIG. 5 is virtually identical to that of FIG. 1 except for the operation of the separate banks A and B and the individual spiral wound ultrafiltration modules 230A–J in each bank.

The spiral wound ultrafiltration modules 230A–J are all initially and simultaneously charged with emulsion for concentration, reclamation, and, optionally, washing. However, it may be desirable to wash or reclaim material from the ultrafiltration modules of either bank A or B, while continuing to hold material in the ultrafiltration modules of the other bank. It also may be desirable to reclaim emulsion from only some of the spiral wound ultrafiltration modules in one bank while other such modules in that bank continue holding material. Valves V218A–B in the spiral wound module inlet lines and valves V219A–B in the spiral wound module concentrate outlet lines are useful in effecting isolation of spiral ultrafiltration modules within bank A or bank B for this purpose.

By utilizing the process schemes of FIGS. 1–2 or 5 or any other purification or concentration technique involving serially-arranged pairs of spiral wound ultrafiltration and plate and frame ultrafiltration modules, a high viscosity emulsion can be produced on a commercial scale. As a result, it is possible to supply such emulsions for curtain coating to photographic substrates at high production rates. This constitutes a significant advance in the art.

Another advantage of the present invention is that the plate and frame ultrafiltration module can be operated without a recirculation loop. Normally, when processing a dilute emulsion, high feed flow rates are required, resulting in the need for a recirculation loop to pump emulsion from the plate and frame ultrafiltration module outlet back to the inlet of the module. By using the plate and frame ultrafiltration module to treat a viscous emulsion already concentrated by the spiral wound ultrafiltration module, flow rates to the plate and frame ultrafiltration module can be reduced, eliminating the need for a recirculation loop.

Although the invention has been described in detail for the purpose of illustration, it is understood that such detail is solely for that purpose and variations can be made therein by those skilled in the art without departing from the spirit and scope of the invention which is defined by the following claims.

What is claimed:

1. A system suitable for separating large sized and high molecular weight materials from a photographic emulsion also containing low molecular weight materials, said system comprising:
   a first vessel;
   a spiral wound ultrafiltration module;
   a plate and frame ultrafiltration module;
   a first conduit to carry material from said first vessel to said spiral wound ultrafiltration module;
   a second conduit to carry material from said first vessel to said plate and frame ultrafiltration module;
   a third conduit to carry material concentrated in either said spiral wound ultrafiltration module or said plate and frame ultrafiltration module to said first vessel; and
   a pressure control valve positioned on said third conduit to hold a back pressure on said spiral wound and plate and frame ultrafiltration modules.

2. A system according to claim 1, wherein said spiral wound ultrafiltration module and said plate and frame ultrafiltration module are paired and a plurality of these pairs are positioned in parallel banks in said system.

3. A system according to claim 2, wherein said spiral wound ultrafiltration module for each bank of paired spiral wound ultrafiltration and plate and frame ultrafiltration modules comprises a plurality of separate spiral wound ultrafiltration modules.

4. A system according to claim 1, wherein said spiral wound ultrafiltration module comprises a plurality of separate parallel spiral wound ultrafiltration modules.

5. A system according to claim 1, wherein said plate and frame ultrafiltration module comprises a plurality of separate parallel plate and frame ultrafiltration modules.

6. A system according to claim 1, further comprising:
   a second vessel;
   a fourth conduit connecting said first and second vessels; and
   a fifth conduit connecting said plate and frame ultrafiltration module and said second vessel.

* * * * *